US006959853B2

(12) United States Patent
Graham et al.

(10) Patent No.: US 6,959,853 B2
(45) Date of Patent: Nov. 1, 2005

(54) FLUXLESS BRAZING METHOD AND METHOD FOR MANUFACTURING LAYERED MATERIAL SYSTEMS FOR FLUXLESS BRAZING

(75) Inventors: Michael E. Graham, Evanston, IL (US); Richard A. Hoffman, deceased, late of Export, PA (US); by Margaret Anna Hoffman, legal representative, Export, PA (US); Brian E. Cheadle, Bramalea (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 10/300,854

(22) Filed: Nov. 21, 2002

(65) Prior Publication Data

US 2003/0197050 A1 Oct. 23, 2003

Related U.S. Application Data

(63) Continuation-in-part of application No. 09/990,507, filed on Nov. 21, 2001, now Pat. No. 6,815,086.

(51) Int. Cl.[7] ................................................ B23K 31/02

(52) U.S. Cl. .................................................. 228/123.1

(58) Field of Search .............................. 228/123.1, 219, 228/181, 221, 262.51, 183; 428/650, 652, 658, 654, 937, 938, 116, 182, 184

(56) References Cited

U.S. PATENT DOCUMENTS

| | | | |
|---|---|---|---|
| 1,627,900 | A | 5/1927 | Hewitson |
| 2,142,564 | A | 1/1939 | Korpium |
| 2,745,799 | A | 5/1956 | Patrie |
| 2,821,014 | A | 1/1958 | Miller |

(Continued)

FOREIGN PATENT DOCUMENTS

| | | | |
|---|---|---|---|
| EP | 587307 | B1 | 12/1996 |
| EP | 0605323 | B1 | 5/2000 |
| EP | 0595601 | B2 | 7/2001 |
| FR | 2617868 | | 7/1988 |
| GB | 1087054 | | 9/1964 |
| GB | 2270086 | | 3/1984 |
| WO | WO0071784 | | 11/2000 |
| WO | WO0168312 | | 9/2001 |
| WO | WO0188226 | | 11/2001 |
| WO | WO0207928 | | 1/2002 |
| WO | WO0238321 | | 5/2002 |
| WO | WO0238326 | | 5/2002 |

OTHER PUBLICATIONS

Research Disclosure 439070, anonymous disclosure, Kenneth Mason Publications Ltd, published Nov. 2000, pp. 1946–1947.

Preparation of and Electroplating on Aluminum Alloys by Zincate Process– American National Standard Institute, Aug. 19, 1974.

B.E. Cheadle and K.F. Dockus, International Congress and Exposition , Detroit, Michigan, Feb. 29–Mar. 4, 1988; SAE Technical Paper Series–Inert Atmosphere Fluxless Brazing of Aluminum Heat Exchangers.

(Continued)

*Primary Examiner*—Johnathan A Johnson
(74) *Attorney, Agent, or Firm*—Michael J. Bell; Howrey LLP

(57) ABSTRACT

A brazing product for fluxless brazing comprises an aluminum or aluminum alloy substrate; a layer of an aluminum eutectic-forming layer applied to the substrate, and a braze-promoting layer comprising one or more metals from the group comprising nickel, cobalt and iron is applied on the eutectic-forming layer. The eutectic-forming layer is preferably Si deposited by physical vapor deposition. The brazing product may be brazed to another aluminum shape or to a shape comprised of a dissimilar metal.

65 Claims, 3 Drawing Sheets

U.S. PATENT DOCUMENTS

| | | | | | |
|---|---|---|---|---|---|
| 3,321,828 | A | | 5/1967 | Miller | |
| 3,332,517 | A | | 7/1967 | Voser | |
| 3,338,725 | A | | 8/1967 | Banks | |
| 3,417,005 | A | | 12/1968 | Baig | |
| 3,482,305 | A | | 12/1969 | Dockus | |
| 3,553,825 | A | | 1/1971 | Dockus | |
| 3,597,658 | A | | 8/1971 | Rivera | |
| 3,675,310 | A | | 7/1972 | Scheiner | |
| 3,703,763 | A | | 11/1972 | Berry | |
| 3,843,333 | A | | 10/1974 | Woods | |
| 3,970,237 | A | | 7/1976 | Dockus | |
| 4,028,200 | A | * | 6/1977 | Dockus | 205/112 |
| 4,164,454 | A | | 8/1979 | Schober | |
| 4,388,159 | A | | 6/1983 | Dockus | |
| 4,489,140 | A | | 12/1984 | Pulliam | |
| 4,785,092 | A | | 11/1988 | Nanba et al. | |
| 4,826,736 | A | | 5/1989 | Nakamura | |
| 4,890,784 | A | | 1/1990 | Bampton | |
| 4,901,908 | A | | 2/1990 | Negura et al. | |
| 5,044,546 | A | | 9/1991 | De Clerck | |
| 5,069,980 | A | | 12/1991 | Namba et al. | |
| 5,072,789 | A | | 12/1991 | Usui et al. | |
| 5,100,048 | A | | 3/1992 | Timsit | |
| 5,232,788 | A | | 8/1993 | Timsit et al. | |
| 5,316,206 | A | | 5/1994 | Syslak | |
| 5,422,191 | A | | 6/1995 | Childree | |
| 5,464,146 | A | | 11/1995 | Zaluzec et al. | |
| 5,466,360 | A | | 11/1995 | Ehrsam | |
| 5,894,054 | A | | 4/1999 | Parachuri et al. | |
| 6,129,262 | A | * | 10/2000 | Cooper et al. | 228/208 |
| 6,379,818 | B1 | * | 4/2002 | Mooij et al. | 428/648 |
| 6,383,661 | B2 | * | 5/2002 | Wittebrood et al. | 428/650 |
| 6,391,476 | B2 | * | 5/2002 | Wittebrood et al. | 428/654 |
| 6,503,640 | B2 | * | 1/2003 | Wittebrood et al. | 428/654 |
| 6,568,584 | B2 | * | 5/2003 | Wittebrood et al. | 228/219 |
| 6,596,413 | B2 | * | 7/2003 | Wittebrood et al. | 428/652 |
| 6,599,645 | B2 | * | 7/2003 | Wittebrood | 428/654 |
| 2001/0040180 | A1 | | 11/2001 | Wittebrood et al. | |
| 2002/0012811 | A1 | | 1/2002 | Wittebrood et al. | |
| 2002/0050511 | A1 | | 5/2002 | Wittebrood et al. | |
| 2002/0086179 | A1 | * | 7/2002 | Wittebrood | 428/652 |
| 2002/0088717 | A1 | | 7/2002 | Wittebrood et al. | |
| 2002/0139685 | A1 | * | 10/2002 | Colombier et al. | 205/181 |
| 2002/0175205 | A1 | | 11/2002 | Wittebrood et al. | |
| 2003/0042146 | A1 | | 3/2003 | Wijenberg et al. | |
| 2003/0064242 | A1 | | 4/2003 | Wittebrood et al. | |
| 2003/0091856 | A1 | * | 5/2003 | Wittebrood | 428/654 |
| 2003/0189082 | A1 | * | 10/2003 | Dockus et al. | 228/56.3 |

OTHER PUBLICATIONS

Aluminum Standards and Data 1984, pp. 1–2; 7; 15–21; 29–30.

Aluminum Standards and Data 1997, The Aluminum Association, 1996, pp. 6–1–6–6.

Designation: B 253–73, Standard Recommended Practice for Preparation of and Electroplating on Aluminum Alloys by the Zincate Process, 1974, pp. 72–81.

Designation: B 253–87 (Reapproved 1993), Standard Guide for Preparation of Aluminum Alloys for Electroplating, pp. 48–54.

Durney, Electroplating Engineering Handbook, Fourth Edition, 1984, pp. 185–188; 245; 247–250.

Engstrom et al., A Multilayer Clad Aluminum Material with Improved Brazing Properties, 1988, pp. 222–226.

Finstock and Brazing Products for Heat Exchanger Applications, Alcan, no date available.

Golby et al., A Study of the Effect of Pretreatment Procedures on the Plating of Aluminium Alloys, Surface Technology, 12, (1981) 141–155.

Golby et al., Factors Influencing the Growth of Zinc Immersion Deposits on Aluminum Alloys, Transactions of the Institute of Metal Finishing, 1981, vol. 59, pp. 17–24.

Lentz et al., Aluminum Brazing Handbook, Third Edition, 1979, pp. 5–6; 8; 24–33; 36; 58–61; 65–66.

Metal Progress, Mid–June DATABOOK 1980, Properties and Applications of Wrought Aluminum Alloys, pp. 56–57.

Metals & Alloys in the Unified Numbering System, Seventh Edition, 1996, pp. 31–35; 42; 44.

Pearson et al., Improvements in the Pretreatment of Aluminum as a Substrate for Electrodeposition, Trans IMF, 1997, 75(3), pp. 93–97.

Such et al., An Improvement in Zincate Method for Plating on Aluminum, 1965, pp. 1027–1034.

The Coil which Goes Around the World Technical Data, no date available.

Van Horn, Aluminum, vol. I. Properties, Physical Metallurgy and Phase Diagrams, 1987, pp. v; 48–55; 162–165; 178–179; 192–209; 300–303.

Wernick et al., The Surface Treatment and Finishing of Aluminium and its Alloys, Fifth Edition, vol. 1, 1987, pp. iii–v; xxx–xxxi; 1 80–183; 190–203.

Wernick et al., The Surface Treatment and Finishing of Aluminum and its Alloys, Fifth Edition, vol. 2, 1987, pp. 1023–1083.

Wyszynski, An Immersion Alloy Pretreatment for Electroplating on Aluminium, Transactions of the Institute of Metal Finishing, 1967, vol. 45, pp. 147–154.

Wyszynski, Electrodeposition on Aluminium Alloys, Transactions of the Institute of Metal Finishing, 1980, vol. 58, pp. 34–40.

* cited by examiner

FLUXLESS BRAZING METHOD AND METHOD FOR MANUFACTURING LAYERED MATERIAL SYSTEMS FOR FLUXLESS BRAZING

CROSS-REFERENCE TO RELATED APPLICATION

This is a continuation-in-part of U.S. patent application Ser. No. 09/990,507, filed Nov. 21, 2001, now U.S. Pat. No. 6,815,086, incorporated herein by reference.

FIELD OF THE INVENTION

The invention addresses the objective of achieving a cladless brazing material system, while maintaining a fluxless brazing system.

BACKGROUND OF THE INVENTION

Brazing commonly involves the use of aluminum-silicon clad aluminum brazing sheet composites. Because sophisticated rolling mill practices are required to produce this traditional composite, a premium cost is involved over conventional flat rolled sheet and strip. Also, available alloy compositions are limited by mill product standardization, by casting limitations, or by scrap recovery considerations that affect the economy of the overall casting or mill operation.

Such conventional brazing alloys can be brazed using fluxless brazing systems, which typically use an electroplated braze-promoting layer. However, there are environmental hazards and liabilities associated with prior art wet electroplating systems for deposition of fluxless braze modifiers. Furthermore, there are limitations on the range of material strip or component dimensions which can be electroplated in high volume production, for example the constraints of fixed size plating cells limit the maximum plateable strip width.

SUMMARY OF THE INVENTION

In one aspect, the invention provides a method for manufacturing an article of manufacture for use in a fluxless brazing process, comprising: (a) providing a metal substrate; (b) applying to the substrate a eutectic-forming layer comprising a material which forms a eutectic with the metal substrate; and (c) applying to the eutectic-forming layer a braze-promoting layer comprising one or more metals selected from the group comprising nickel, cobalt and iron. In another aspect, the invention provides a method of brazing unclad first and second aluminum alloy shapes, at least one of the alloy shapes comprising a metal substrate, a layer of a eutectic-forming material applied to the substrate, and a layer of a braze-promoting layer on the eutectic forming material, the method comprising: (a) assembling the shapes into an assembly to create contact between the shapes; (b) heating the assembly under a vacuum or in an inert atmosphere in the absence of a brazing flux material at an elevated temperature and for a time sufficient for formation of a molten filler metal comprising a eutectic of said metal substrate and the eutectic forming material, and melting and spreading of the molten filler metal to form a joint between the shapes; and (c) cooling of the joined assembly.

In yet another aspect, the invention provides a brazing product for fluxless brazing, comprising: (a) a metal substrate; (b) a eutectic-forming layer applied on the metal substrate and comprising a material which forms a eutectic with the metal substrate; and (c) a braze-promoting layer comprising one or more metals selected from the group comprising nickel, cobalt and iron.

DETAILED DESCRIPTION OF PREFERRED EMBODIMENTS

Figure 1:
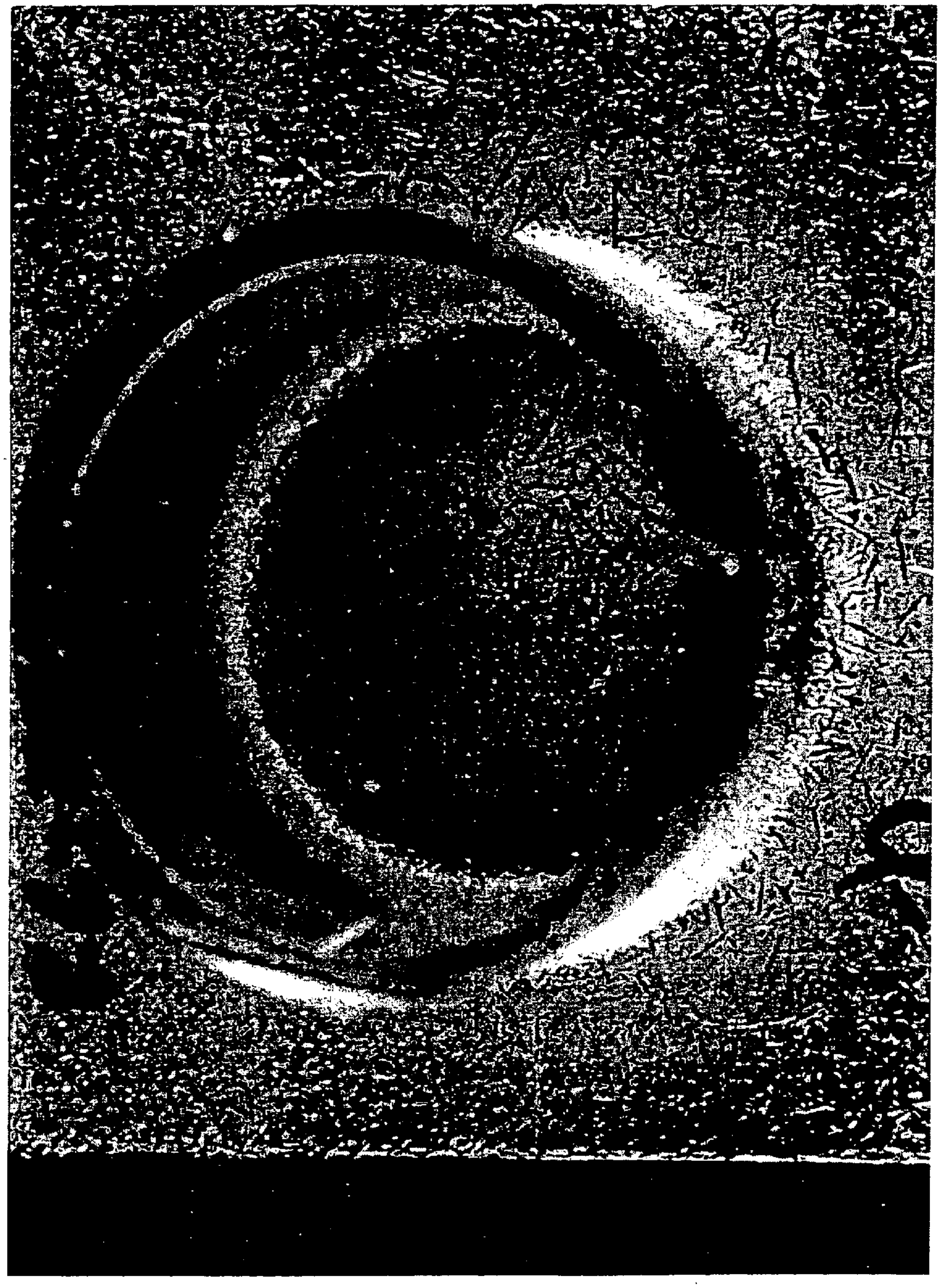
FIGS. 1 to 3 are photographs illustrating a brazed assembly according to a preferred embodiment of the invention.

The present invention provides an in-situ filler metal forming material system that may eliminate the need for separately clad filler metal (or separately provided, for example as performs, etc), while maintaining a fluxless brazing method. The present invention also provides an adjustable material braze system, so that for example, braze fillet size or fluidity may be adjusted according to the product requirements, or on different parts of the same product, for example opposite sides of the same brazing sheet.

The inventors have also recognized that such a system can be applied to provide a range of filler metal compositions, so that both low braze temperatures and normal Al—Si braze temperatures, may be achieved in a fluxless format. The ability to tailor the material system (filler metal, and braze promoters . . . along with braze modifiers, bonding layers, and temperature modifiers) provides significantly increased flexibility in application to aluminum alloy systems that are either not now brazeable, or not available in forms suitable for brazing. These include, for instance, high alloy content 7xxx, 2xxx, 6xxx or 8xxx series aluminum, or aluminum castings and die-castings. Specific alloys to which a Si eutectic forming layer has been applied include 3003, 5052 (2.8% Mg) and 1100 alloys. The adjustable braze response characteristics are applicable to demanding product applications, such as internal joints of heat exchangers, or brazing of intricate flow field channels formed in metal plate fuel cell engines.

The inventors have developed PVD deposition methods and layered sequence compositions, including ancillary methods to enable the practical achievement of "dry" material cleaning methods to allow preferred inline deposition processes. Successfully demonstrated dry cleaning techniques such as plasma or ion-cleaning are important steps in minimizing the environmental impact of the brazing process, and have been demonstrated to be practical as well.

The proposed fluxless brazing system begins with a substrate, which may preferably comprise an aluminum sheet material which may comprise pure aluminum, any one of a number of aluminum alloys, or a dissimilar metal coated with aluminum, eg. aluminum-coated titanium or steel. Examples of specific aluminum substrates, which can be used, are aluminum AA1100, 3003, 5xxxx, and 6xxx series aluminum alloys. In the case of 6xxx, or 5xxxx series aluminum alloys, which contain 1 or 2% or even 3% Mg, the diffusion of Mg from the core into the coating may be exploited to assist in the braze reaction, provided that a coating system using Ni as a topcoat braze promoter is employed. The small amounts of Mg that can diffuse into the Si or liquid eutectic film during brazing, may assist the braze-promoting reaction of Ni in this case, since Mg itself is a braze promoter and the applicant has discovered that the use of Ni braze promoters can provide a synergistic benefit with materials containing small amounts of Mg. It is further believed that substrates containing large amounts of alloying elements, where such elements might otherwise be expected to diffuse to the surface during brazing and cause deleterious effects, can be exploited by the developed invention by depositing or providing suitable barrier coatings, which may include aluminum or Ti etc. In such highly alloyed aluminum substrates, for example high Zn 7xxx alloys, or Al—Li 2xxx or 8xxx alloys, a suitable low temperature filler metal system may be needed to accommodate the depressed melting temperature ranges of these alloyed materials.

In its simplest embodiment, a substrate is provided with a liquid-forming layer, preferably eutectic-forming layer, preferably comprising a coating of Si. Other liquid or eutectic-forming layers may also be preferred, for example zinc, zinc-antimony, zinc-nickel, zinc-silicon, zinc-magnesium, aluminum-silicon or aluminum-zinc.

The substrate may comprise aluminum or one of the aluminum alloys mentioned above. Alternatively, depending on the composition of the eutectic-forming layer, the substrate could be comprised of one of the dissimilar metals mentioned in the applicants' co-pending application no. 10/300,836 entitled "Improvements in Fluxless Brazing", filed on Nov. 21, 2002, and incorporated herein by reference.

The Si eutectic forming layer is deposited by physical vapor deposition (PVD) in one or more steps. Here, (PVD) is understood to include either sputtering including magnetron sputtering, and also electron beam (EB) evaporation. For practical benefits such as rates of deposition, EB coating methods are preferred. Cathodic arc is another commercial PVD system, which may be suitable for certain metals. It may be preferred to use a combination of source types, depending on the specific metal being deposited. For example, EB-evaporation is likely best for Si, but this may or may not be best for Pb or Bi. However, comparatively little Pb is required, so a sputtered rate may be acceptable, and more efficient use of the Pb might be possible. The Ni or other metal such as Pd, likewise does not require much thickness and other source options might be possible, although EB evaporation may still be preferred.

Sputtering of top layers may help to hold temperature of the sheet down and it puts less material on the chamber walls and more on the substrate. As applied, the Si coating serves as a eutectic-forming layer. Preferably, the thickness of the Si coating in the system of the invention will be from about 3 to about 20 microns, more preferably from about 5 to about 10 microns, when combined with the braze promoters described below. Where such braze promoters are not used, a thicker Si coating may be necessary to obtain equivalent braze quality; or equivalent braze quality may be unachievable, or a brazing flux may become a necessary compensator. Similarly, in combination with other eutectic formers it may be possible to use thinner Si coatings; however so far it appears that a Si layer of about 1 micron should be in contact with the Ni braze promoter. Brazing (fluxless) without this layer is very difficult indeed in this particular system; in an alternate system, for instance an Al—Zn, or Zn—Mg etc liquid forming system, Si may not be as important.

An extremely thin [20–50 ] layer of braze modifier is preferably deposited at the interface of the Si and the braze promoting layer. Preferred braze modifiers are selected from the group comprising bismuth, lead, lithium, antimony, magnesium, strontium and copper. Bismuth and lead are preferred where the eutectic-forming layer comprises silicon and the braze-promoting layer is nickel-based.

Too thick a layer of braze modifier may interfere with contact of Ni and Si. It may also be preferred to locate this layer at the interface between the aluminum substrate and the eutectic-forming layer, although it can interfere with adhesion of the eutectic forming layer to the substrate, and can cause peeling of the coating in some cases due to heat transfer to the aluminum substrate during deposition of the Si, or due to the time of exposure to the e-beam source, associated radiation from the vapor cloud, and the heat of condensation of the Si vapor on the substrate. To prevent this, it may be preferred to apply the Si as a plurality of layers, with a cooling phase between the depositions of each layer. In addition, provision may be made for substrate cooling during coating, for example by contact with chilled surfaces on the back side of the sheet being coated, which is limited by thermal transfer of materials and contact time and geometry.

After formation of the silicon coating, the silicon coated aluminum sheet is provided with coatings of one or more braze promoters and optional braze modifiers. Preferred braze promoters are selected from one or more members of the group comprising nickel, cobalt, iron or palladium. More preferably, the braze-promoting layer is nickel-based and may preferably comprise pure nickel or nickel in combination with one or more alloying elements and/or impurities selected from the group comprising cobalt, iron, lead, bismuth, magnesium, lithium, antimony and thallium. Specific examples of nickel-based braze-promoting layers are nickel, nickel-bismuth, nickel-lead, nickel-cobalt, nickel-bismuth-cobalt, nickel-lead-cobalt, nickel-lead-bismuth, nickel-bismuth-antimony, etc. The preferred amounts of alloying elements may preferably be as disclosed in applicant's co-pending patent application no. 10/300,836.

As an alternative to the above embodiment, the substrate can be coated with an Al—Si alloy; or sequential thin layers of Al and Si to create a desired composition of filler metal. Experiments suggest that an initial layer of thin aluminum or silicon, having a thickness of not more than about 1 micron, is preferred for adhesion of the Al—Si layer and also for the Si eutectic-forming layer described above. Similarly, a thin layer of silicon should be applied immediately under the Pb or Bi/Ni coating. A benefit of the sequential thin-layered approach is that heating and the stress build-up in the coating from the rate determining Si deposition step, is reduced. A thin layer of zinc, or an aluminum-zinc alloy, may be substituted for the 1 micron preferred Al or Si bonding layer or interlayer.

Still another method of depositing an Al—Si filler metal-forming material layer, is to use the PVD process to deposit a pre-alloyed Al—Si alloy. In this case, it may be preferable to deposit a hypereutectic composition, i.e., in the range 12–20% Si or higher, with suitable provisions made to compensate for unequal deposition rates of the two-phase alloy. Similarly, it will be obvious that other alloy additions such as Mg or Cu may be added to the Al–Si alloy, to achieve ternary or quaternary, etc., alloy compositions. Zinc or zinc-aluminum may also be used in conjunction with the silicon coating, and the zinc may be prealloyed with antimony or magnesium.

In one embodiment of the system, an extremely thin layer of Pb or Bi is deposited on top of the Si coating. This is followed by application of a topcoat of Ni having a thickness of about 1 micron, or at least 0.25 to 0.5 microns.

In another embodiment of the system, Fe or Co are used to replace Ni or as alloy additions to Ni.

In yet another embodiment of the system, a layer of Zn or Al–Zn is provided in addition to the Si coating and the braze promoters. This additional layer may preferably be located underneath the Si coating or immediately on top of it. Alternatively, the Si could be pre-alloyed with Zn or Al—Zn. The use of Pb or Bi and the Ni layers may enhance the performance of these alloys.

In yet another embodiment, Li may be added, possibly to replace or supplement the Pb or Bi or Sb. Li may preferably be deposited in an alloyed form, such as Al—Li, due its extreme reactivity, and is likely present as an extremely thin Al—Li layer which may be located underneath the Si or Zn, or on top of the Zn or Si, but below the upper-most nickel braze promoter. If Sb is deposited it may similarly be deposited as an alloy with Al, or Zn, or as a constituent of a Zn—Al alloy.

In yet another embodiment, a barrier coating may be provided to temporarily restrict diffusion of Si or Zn into the aluminum core; or to limit diffusion of undesireable core elements into the liquid filler metal. The barrier coating may comprise a thin coating of Ni, Ti, Ta, Cu, Nb, Sn, Pb, Bi or Al. Topcoats of braze promoters would be applied as above. During brazing, the barrier coating is eventually consumed so that eventual alloying with the aluminum core may occur, while permitting most of the liquid eutectic filler metal to remain liquid to effect the braze joint. Alternatively, if a barrier coating is required to prevent migration of species from the core into the liquid forming layer or vice versa, the liquid former will need to be provided with other material layers so that it can form its own liquid without access to the substrate, and a thicker or more resistant barrier coating may then be used.

EXAMPLES

Example 1

The method according to the invention was applied as follows:

Substrate : AA3003 plate, AA3003 tube.

Cleaning method: caustic cleaned plate (coupon), ie etch, rinse, desmut, rinse, dry.

Coating sequence: 3.4 μm Al/0.9 μm Si/3.4 μm Al/0.9 μm Si/3.4 μm Al/1.25 μm Si/0.005 μm Pb/1.5 μm Ni.

Braze Quality Very Good (Good to excellent based on 4 samples run per test)

Purpose of this coating sequence: 1) to deposit an Al—Si alloy on the surface of the substrate, using a sequential layer approach. This approach reduces stress in each coating layer, and theoretically reduces reaction distance between Si and Al, for melting. It was found that as far as brazing goes, it does not make much difference whether the Al—Si is applied in sequence, or just one layer of Si in contact with the Al substrate, as long as the Si layers are not too thick.

Preferably, the last layer deposited is Si, then a very thin Pb (or Bi) layer is applied, and then Ni. This is a particularly preferred embodiment. Furthermore, it is preferred that the Ni be essentially in contact with the Si, such that the very thin Pb or Bi layer does not degrade contact between the Ni and Si, and in fact it is speculated that the low melting Bi or Pb may actually improve contact during brazing.

Figure 2:
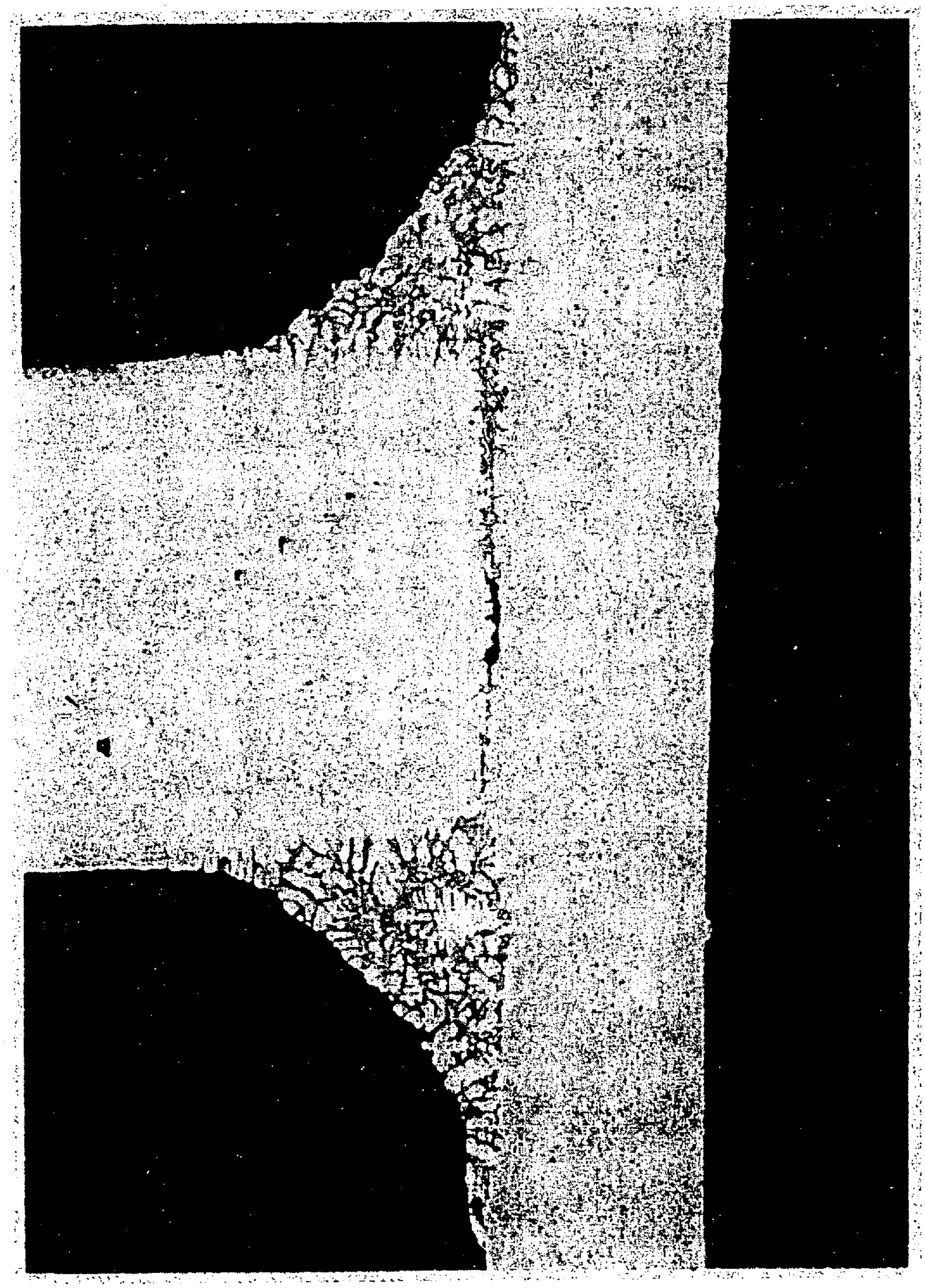
Figure 3:
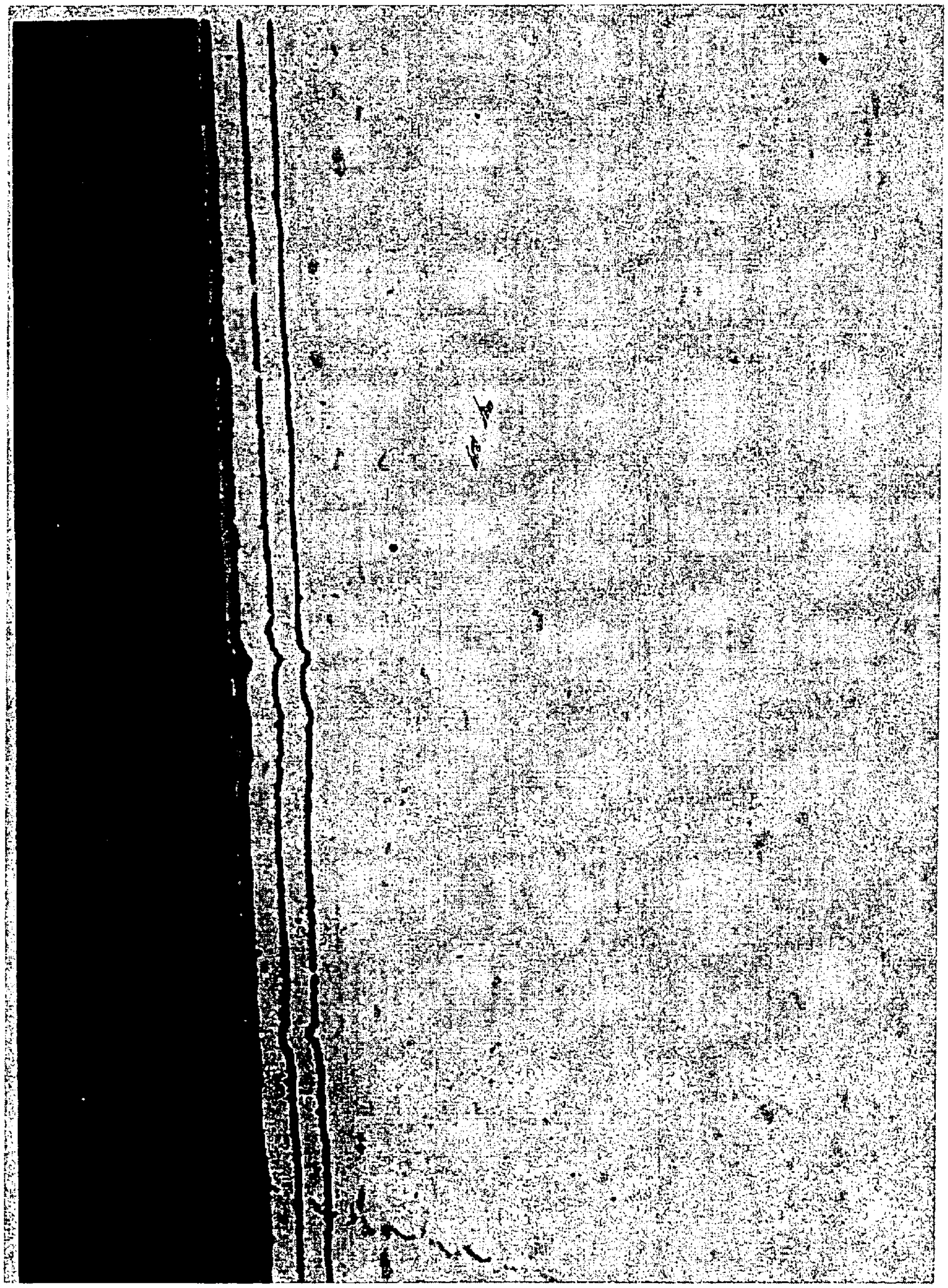

FIG. 1 illustrates the brazed plate and tube combination, at a magnification of 3–4×. The tube is 0.75" in diameter. FIG. 2 illustrates a cross-section through the tube wall to plate joint, at a magnification of 38×. There is excellent wetting and fillet formation from the in-situ formed eutectic. FIG. 3 illustrates a cross-section of the layered deposit, in the as-deposited condition, i.e. prior to braze. It is possible to resolve the individual layers shown in FIG. 3, with Ni on the outermost (upper) surface.

EBEAM Examples 2–12

Coating of the substrates was carried out by pretreating approximately 4"×4" coupons of the target substrate through various means including (a) solvent degreasing, (b) caustic cleaning, whereby the coupon is immersed in 10% Oakite 360 etch solution for approximately 45 seconds, tap water rinsed, deoxidized in Oakite I25 for 10 seconds, tap water rinsed and dried, (c) mechanical brush cleaned with 3M 7A brushes, (d) sputtering with an inert gas in vacuum, (e) ion etching. Multilayer coatings were applied to the target surface through electron beam physical vapour deposition of variously prepared sources. The coupons were divided into four approximately equal samples and assessed through brazing.

Coating thicknesses were assessed using a deposition rate detector as well as microscopic (SEM) assessment of metallurgical sections.

Braze tests were carried out to demonstrate the effectiveness of the coating on a target substrate sheet. In each test, braze quality was determined by placing the flat, cut end of an AA3003 O-temper aluminum tube [0.65" ID×0.75" OD, cut to 0.5" length and ground flat on a 1.5"×1.5" coupon of target substrate sheet and heating the arrangement in a preheated furnace in a flowing nitrogen atmosphere to approximately 1100° F. for a dwell time of approximately 1 minute at maximum temperature. Braze quality was reported as excellent, very good, good, fair and poor based on visual attribute data such as fillet size, wetting characteristics, surface appearance, lustre, etc.

Example 2

AA5052 sheet samples were prepared through (a) sputter cleaning and (b) mechanical brushing followed by deposition of 16 μm silicon to the target interface, incremental deposition to the newly formed surface of 0.03 μm lead then 1 μm nickel. The coated sheet samples were subdivided into four coupons each for individual braze assessment. Both sets of coupons exhibited an excellent braze.

Example 3

An AA3003 sheet sample was prepared through caustic etching followed by deposition of 16 μm silicon to the target interface, incremental deposition to the newly formed surface of 0.03 μm lead then 1.0 μm nickel. The coated sheet sample was subdivided into four coupons for individual braze assessment. All coupons exhibited an excellent braze.

Example 4

An AA3003 sheet sample was prepared through caustic etching followed by deposition of 16 μm silicon to the target interface, incremental deposition to the newly formed surface of 0.037 μm bismuth then 1.0 μm nickel. The coated sheet sample was subdivided into four coupons for individual braze assessment. Three coupons exhibited an excellent braze, while one exhibited a good braze.

Example 5

AA3003 sheet samples were prepared through ion etching for (a) 20 minutes, (b) 30 minutes followed by deposition of 16 μm silicon to the target interface, incremental deposition to the newly formed surface of 0.03 μm lead then 1.0 μm nickel. The coated sheet samples were subdivided into four coupons for individual braze assessment. The 20 minute etched coupons exhibited 2 excellent and 2 good brazed samples. The 30 minute etched coupons exhibited three excellent and 1 good braze.

Example 6

An AA3003 sheet sample was prepared through caustic etching followed by deposition of 28 μm silicon to the target interface, incremental deposition to the newly formed surface of 0.03 μm lead then 1.0 μm nickel. The coated sheet sample was subdivided into four coupons for individual braze assessment. All coupons exhibited an excellent braze.

Example 7

AA3003 sheet samples were prepared through caustic etching followed by deposition of 6 μm silicon to the target interface, incremental deposition to the newly formed surface of 0.03 μm lead then (a) 0.05 μm nickel on one sheet and (b) 1.0 μm nickel on the second. The coated sheet samples were subdivided into four coupons for individual braze assessment. The 0.05 μm coupons exhibited 2 excellent and 2 good brazed samples. The 1.0 μm coupons all exhibited an excellent braze.

Example 8

AA3003 sheet samples were prepared through caustic etching followed by deposition of 16 μm silicon to the target interface, incremental deposition to the newly formed surface of (a) no lead or nickel on the first and (b) 0.03 μm lead then 1.0 μm nickel on the second. The coated sheet samples were subdivided into four coupons for individual braze assessment. The non-lead/nickel coupons exhibited 2 good, 1 fair and 1 poor brazed sample. The lead containing sample exhibited 2 excellent and 2 good samples.

Example 9

AA3003 sheet samples were prepared through caustic etching followed by incremental deposition of alternating layers of aluminum and silicon as follows 2.0 Al, 1.8 Si, 4.0 Al, 1.8 Si, 4.0 Al, 1.75 Si μm to the target interface and subsequent deposition to the newly formed surface of (a) 0.5 μm nickel and (b) 0.01 μm lead then 0.5 μm nickel. The coated sheet samples were subdivided into four coupons for individual braze assessment. Three of the non-leaded samples exhibited a fair braze and one sample exhibited a poor braze. The leaded samples all exhibited an excellent braze.

Example 10

An AA3003 sheet sample was prepared through caustic etching followed by deposition of 10 μm zinc to the target interface, incremental deposition to the newly formed surface of 0.25 μm nickel. The coated sheet sample was subdivided into four coupons for individual braze assessment. All coupons exhibited fair braze.

Example 11

An AA3003 sheet sample was prepared through caustic etching followed by deposition of 25 μm zinc to the target interface, incremental deposition to the newly formed surface of 0.5 μm silicon and 0.25 μm nickel. The coated sheet sample was subdivided into four coupons for individual braze assessment at 1100° F. Three coupons exhibited good braze. Two coupons of the same composition were brazed at 1000° F. and exhibited good braze.

Example 12

An AA3003 sheet sample was prepared by a novel combination of ion cleaning with oxygen for 3 minutes followed by a 30 minute ion etch then deposition of 5 μm silicon to the target interface, incremental deposition to the newly formed surface of 0.03 μm lead then 1.0 μm nickel. The coated sheet sample was subdivided into four coupons for individual braze assessment. All coupons exhibited a very good braze.

What is claimed is:

1. A method for manufacturing an article of manufacture for use in a fluxless brazing process, comprising:

(a) providing a metal substrate;

(b) applying to the substrate a eutectic-forming layer comprising a material which forms a eutectic composition with the metal substrate; and (c) applying to the eutectic-forming layer a braze-promoting layer comprising one or more metals selected from the group consisting of nickel, cobalt, palladium and iron, wherein the eutectic-forming layer comprises silicon deposited by physical vapor deposition.

2. The method of claim 1, wherein the metal substrate is comprised of aluminum or an aluminum alloy.

3. A method of brazing unclad first and second aluminum alloy shapes, at least one of the alloy shapes comprising a metal substrate, a layer comprising a eutectic-forming material provided on the substrate, and a braze-promoting layer provided on the layer of eutectic forming material, the method comprising:

(a) assembling the shapes into an assembly in which the shapes are in contact with each other;

(b) heating the assembly under a vacuum or in an inert atmosphere in the absence of a brazing flux material at an elevated temperature and for a time sufficient for formation of a molten filler metal comprising said metal substrate and the eutectic forming material, and melting and spreading of the molten filler metal to form a joint between the shapes; and (c) cooling of the joined assembly.

4. The method of claim 1, wherein the metal substrate comprises an aluminum alloy selected from the group consisting of AA2xxx, AA6xxx, AA7xxx, AA8xxx, AA1100, AA3003 and AA5052 alloys.

5. The method of claim 1, wherein the metal substrate comprises an aluminum casting alloy.

6. The method of claim 1, wherein the metal substrate comprises aluminum-coated titanium or aluminum-coated steel.

7. The method of claim 1, wherein the metal substrate comprises an aluminum-magnesium alloy.

8. The method of claim 1, wherein the silicon is deposited in one or more steps.

9. The method of claim 8, wherein the silicon is deposited by a plurality of steps and wherein the substrate is cooled between silicon deposition steps.

10. The method of claim 1, wherein the silicon is deposited in a thickness of from about 3 microns to about 20 microns.

11. The method of claim 10, wherein the silicon is deposited in a thickness of from about 5 to about 10 microns.

12. The method of claim 1, wherein the eutectic-forming layer further comprises aluminum.

13. The method of claim 12, wherein the aluminum and silicon are sequentially deposited as a plurality of alternating layers by physical vapor deposition.

14. The method of claim 13, wherein an outermost one of said alternating layers, which is applied directly under the braze-promoting layer, comprises silicon.

15. The method of claim 14, wherein said outermost silicon layer has a thickness of about 1 micron.

16. The method of claim 12, wherein the aluminum and silicon are co-deposited as an alloy by physical vapor deposition.

17. The method of claim 16, wherein the alloy contains silicon in an amount of at least 12 percent by weight.

18. The method of claim 17, wherein the alloy further comprises a metal selected from the group consisting of magnesium, zinc and copper.

19. The method of claim 1, wherein physical vapor deposition is selected from the group consisting of electron beam evaporation, sputtering and cathodic arc.

20. The method of claim 1, wherein the braze-promoting layer comprises nickel.

21. The method of claim 20, wherein the braze-promoting layer further comprises one or more alloying elements selected from the group consisting of cobalt, iron, lead, bismuth, magnesium, lithium, antimony and thallium.

22. The method of claim 21, wherein the braze-promoting layer comprises a nickel-based alloy selected from the group consisting of nickel-bismuth, nickel-lead, nickel-cobalt, nickel-bismuth-cobalt, nickel-lead-cobalt, nickel-lead-bismuth and nickel-bismuth-antimony.

23. The method of claim 1, wherein the braze-promoting layer has a thickness of 0.05 to about 1.0 microns.

24. The method of claim 1, further comprising the step of applying a braze modifier layer at an interface between the eutectic-forming layer and the braze-promoting layer or at an interface between the metal substrate and the eutectic-forming layer, the braze modifier layer comprising one or more metals selected from the group consisting of bismuth, lead, lithium, antimony, magnesium, strontium and copper.

25. The method of claim 24, wherein the braze modifier layer and the braze-promoting layer are applied by sputtering.

26. The method of claim 25, wherein the braze modifier layer has a thickness of 20 to 50 nanometers.

27. The method of claim 24, wherein the braze-promoting layer comprises nickel and wherein the braze modifier layer is selected from the group consisting of bismuth and lead.

28. The method of claim 24, wherein the braze modifier layer comprises lithium which is deposited in the form of an aluminum-lithium alloy.

29. The method of claim 24, wherein the braze modifier layer comprises antimony which is deposited in the form of an alloy with aluminum or zinc.

30. The method of claim 1, further comprising the step of applying a bonding layer directly to the metal substrate, the bonding layer comprising one or more elements selected from the group consisting of aluminum, zinc and silicon.

31. The method of claim 30, wherein the bonding layer is applied by physical vapor deposition.

32. The method of claim 30, wherein the bonding layer has a thickness of about 1 micron.

33. The method of claim 1, further comprising the step of applying a barrier coating to temporarily restrict diffusion of silicon from the eutectic-forming layer into the metal substrate, the barrier coating comprising one or more elements selected from the group consisting of nickel, titanium, tantalum, copper, niobium, tin, lead, bismuth and aluminum, the barrier coating being applied to the metal substrate before application of the eutectic-forming layer.

34. The method of claim 3, wherein the metal substrate of said at least one shape comprises aluminum or an aluminum alloy.

35. The method of claim 3, wherein the metal substrate of said at least one shape comprises an aluminum alloy selected from the group consisting of AA2xxx, AA6xxx, AA7xxx, AA8xxx, AA1100, AA3003 and AA5052 alloys.

36. The method of claim 3, wherein the metal substrate of said at least one shape comprises an aluminum casting alloy.

37. The method of claim 3, wherein the metal substrate of said at least shape comprises an aluminum-magnesium alloy.

38. The method of claim 3, the eutectic-forming layer of said at least one shape comprises a material which forms a eutectic with aluminum.

39. The method of claim 38, wherein the eutectic-forming layer comprises silicon, zinc, zinc-antimony, zinc-nickel, zinc-silicon, zinc-magnesium, aluminum-silicon or aluminum-zinc.

40. The method of claim 39, wherein the eutectic-forming layer comprises silicon.

41. The method of claim 40, wherein the eutectic-forming layer has a thickness of from about 3 microns to about 20 microns.

42. The method of claim 41, wherein the eutectic-forming layer has a thickness of from about 5 to about 10 microns.

43. The method of claim 39, wherein the eutectic-forming layer comprises aluminum-silicon.

44. The method of claim 43, wherein the eutectic-forming layer comprises a plurality of alternating layers of silicon and aluminum.

45. The method of claim 44, wherein an outermost one of said alternating layers, which is provided directly under the braze-promoting layer, comprises silicon.

46. The method of claim 45, wherein said outermost silicon layer has a thickness of about 1 micron.

47. The method of claim 43, wherein the eutectic-forming layer contains silicon in an amount of at least 12 percent by weight.

48. The method of claim 43, wherein the eutectic-forming layer further comprises a metal selected from the group consisting of magnesium, zinc and copper.

49. The method of claim 3, wherein the braze-promoting layer of said at least one shape comprises one or more metals selected from the group consisting of nickel, cobalt, iron and palladium.

50. The method of claim 49, wherein the braze-promoting layer comprises nickel.

51. The method of claim 50, wherein the braze-promoting layer further comprises one or more alloying elements selected from the group consisting of cobalt, iron, palladium, lead, bismuth, magnesium, lithium, antimony and thallium.

52. The method of claim 51, wherein the braze-promoting layer comprises a nickel-based alloy selected from the group consisting of nickel-bismuth, nickel-lead, nickel-cobalt, nickel-bismuth-cobalt, nickel-lead-cobalt, nickel-lead-bismuth and nickel-bismuth-antimony.

53. The method of claim 3, wherein the braze-promoting layer of said at least one shape has a thickness of 0.05 to about 1.0 microns.

54. The method of claim 3, said at least one shape further comprising a braze modifier layer provided at an interface between the eutectic-forming layer and the braze-promoting layer or at an interface between the metal substrate and the eutectic-forming layer, the braze modifier layer comprising one or more metals selected from the group consisting of bismuth, lead, lithium, antimony, magnesium, strontium and copper.

55. The method of claim 54, wherein the braze modifier layer has a thickness of 20 to 50 nanometers.

56. The method of claim 54, wherein the eutectic-forming layer of said at least one shape comprises silicon, wherein the braze-promoting layer comprises nickel, and wherein the braze modifier layer is selected from the group consisting of bismuth and lead.

57. The method of claim 3, said at least one shape further comprising a bonding layer provided directly on the metal substrate, the bonding layer comprising one or more elements selected from the group consisting of aluminum, zinc and silicon.

58. The method of claim 57, wherein the bonding layer has a thickness of about 1 micron.

59. The method of claim 3, wherein the eutectic-forming layer of said at least one shape comprises silicon, and wherein said at least one shape further comprises a barrier coating to temporarily restrict diffusion of silicon from the eutectic-forming layer into the metal substrate, the barrier coating comprising one or more elements selected from the group consisting of nickel, titanium, tantalum, copper, niobium, tin, lead, bismuth and aluminum, the barrier coating being applied between to the metal substrate before application of the eutectic-forming layer.

60. The method of claim 1, further comprising the step of dry cleaning the metal substrate before application of the eutectic-forming layer, wherein the dry cleaning is performed by a technique selected from the group consisting of plasma-cleaning and ion-cleaning.

61. The method of claim 60, wherein the dry cleaning step comprises ion cleaning with oxygen.

62. The method of claim 1, further comprising the step of applying a layer comprised of Pb, Bi, Zn or Sn between the metal substrate and the eutectic-forming layer.

63. The method of claim 27, further comprising the step of applying a layer comprised of Zn between the metal substrate and the eutectic-forming layer.

64. The method of claim 16, wherein the alloy of Al and Si further comprises Mg or Cu.

65. The method of claim 40, wherein said at least one shape further comprises a layer comprised of Zn between the metal substrate and the eutectic-forming layer.

* * * * *

UNITED STATES PATENT AND TRADEMARK OFFICE
CERTIFICATE OF CORRECTION

PATENT NO. : 6,959,853 B2
DATED : November 1, 2005
INVENTOR(S) : Michael E. Graham et al.

It is certified that error appears in the above-identified patent and that said Letters Patent is hereby corrected as shown below:

Column 10,
Line 2, “at least shape” should read -- at least one shape --.
Line 4, “The method of claim 3, the eutectic-forming layer of” should read -- The method of claim 3, wherein the eutectic-forming layer of --.

Column 11,
Line 16, “being applied between to the metal substrate” should read -- being applied to the metal substrate --.

Signed and Sealed this

Fourteenth Day of February, 2006

JON W. DUDAS
*Director of the United States Patent and Trademark Office*

UNITED STATES PATENT AND TRADEMARK OFFICE

CERTIFICATE OF CORRECTION

PATENT NO. : 6,959,853 B2
APPLICATION NO. : 10/300854
DATED : November 1, 2005
INVENTOR(S) : Graham et al.

It is certified that error appears in the above-identified patent and that said Letters Patent is hereby corrected as shown below:

Title Page, Item (75) Inventors, change "Michael E. Graham, Evanston, IL (US); Richard A. Hoffman, deceased, late of Export, PA (US); by Margaret Anna Hoffman, legal representative, Export, PA (US); Brian E. Cheadle, Bramalea (CA)" to --Michael E. Graham, Evanston, IL (US); Richard A. Hoffman, deceased, late of Export, PA (US); by Margaret Anna Hoffman, legal representative, Export, PA (US); Brian E. Cheadle, Bramalea (CA); Robert H. Krueger, Spring Grove, IL (US); Kostas F. Dockus, deceased, late of Cicero IL (US); by Stefanija Kisielius, legal representative US).--

Signed and Sealed this

Seventh Day of April, 2009

JOHN DOLL
*Acting Director of the United States Patent and Trademark Office*